United States Patent Office 3,247,170
Patented Apr. 19, 1966

3,247,170
COPOLYMERS AND TERPOLYMERS OF 1-6 DIOLE-
FINS AND MONOVINYL COMPOUNDS
Charles D. Wright, White Bear Lake, Minn., assignor to
Minnesota Mining and Manufacturing Company, St.
Paul, Minn., a corporation of Delaware
No Drawing. Filed Aug. 1, 1962, Ser. No. 213,870
8 Claims. (Cl. 260—78.5)

This invention relates to new and useful copolymers of 2-substituted alkyl diallylacetic esters with vinyl monomers, and to methods for making the same.

It is an object of this invention to provide novel linear polymers. A further object of the invention is to provide a process for the preparation of linear copolymers. Other objects will become evident from the disclosure made herein.

In accordance with the above and other objects of the invention, this invention provides the class of copolymers consisting essentially of randomly recurring units of the general formula

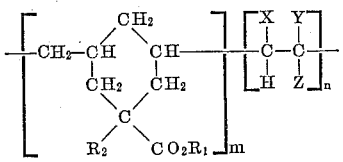

wherein $R_1$ is an alkyl radical having from 1 to 18 carbon atoms, $R_2$ is selected from the group consisting of $-CO_2R_1$ and $-CN$, X, Y and Z taken separately are each selected from the group consisting of hydrogen, chlorine, bromine, lower acyloxy, lower alkoxycarbonyl, lower perfluoroalkoxy carbonyl, carboxy, cyano, phenyl and methyl, and X and Y taken together with the two carbon atoms between them form a ring structure selected from the group consisting of 1,3-dioxol-2-one and dihydrofuran-2,5-dione; and $m$ and $n$ are integral numbers in a ratio of from about 1:200 to about 3:2 and the sum is not less than 5 and up to about 500. The preferred range of copolymers of the invention is that in which the ratio $m:n$ is from about 1:9 to about 1:1.

The copolymers of the invention are formed by copolymerization, as more fully hereinafter described, of from 0.5 to 60 mole percent of an ester of the general formula:

(1) 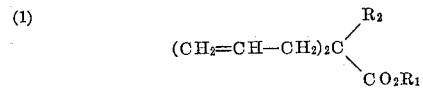

with from 99.5 to 40 mole percent of a vinyl monomer copolymerizable therewith of the general formula (2) 

wherein $R_1$, $R_2$, X, Y and Z have the above significance.

It will be seen that the cyclic moieties of the copolymers, formed from the diallyl compounds of Formula 1, are present in from 0.5 to 60 mole percent and the linear moieties, from the vinyl monomers of Formula 2, in from 99.5 to 60 mole percent of the molecule as a whole. The preferred ranges are from 10 to 50 and 90 to 50 mole percent respectively. Terminal groups are not significant in amount in the copolymers as a whole.

Copolymers of this invention which contain a carboxylic acid group exist either as the free acid or as a salt thereof. Mixtures of these two forms are possible. As a practical matter, any of the copolymers of this invention can be hydrolyzed to the carboxylic acid or carboxylic salt form. The cations in these salts are selected from the group consisting of alkali metals, ammonium, or mono-, di-, tri- or tetra-organo substituted ammonium radicals, such as the butylammonium, dimethylammonium, trimethylammonium, tetrabutylammonium, and salts with ephedrine, papaverine and the like.

The copolymers of this invention are very unusual in that they are linear copolymers of a diolefin with a vinyl monomer and are not cross-linked when formed. Thus, polar solvents usually can be found which will dissolve these copolymers. However, linear copolymers of the invention formed from highly polar comonomers may be difficulty soluble in polar solvents.

The linearity of the copolymers of the invention results because cyclization of the diolefin occurs at each additional step during the copolymerization. Thus the diolefin copolymerizes essentially as a monofunctional monomer. This feature is especially unusual in the high molecular weight copolymers of this invention. As the art appreciates, diolefins ordinarily are used as cross-linking agents in vinyl polymerization and so tend to minimize solubility of the resulting polymer, but in the present instance the diolefin has not caused cross-linking and instead has itself cyclized, producing this most unexpected effect of solubility in these product copolymers.

Another very unusual feature of the reaction of the invention is the high reactivity of diolefins towards copolymerization with vinyl monomers of Formula 2 above. As is well known, 1-olefins do not readily copolymerize with these same vinyl monomers of Formula 2. It should be noted that the diolefinic monomers of Formula 1 contains this 1-olefinic structure and therefore one would not expect the observed high reactivity associated with the copolymer products of this invention. It is believed that this unusual reactivity to copolymerization is associated with the presence of the two double bonds in the heptadiene structure of Formula 2 compounds. The opportunity for cyclization seems to enhance the reactivity of both double bonds.

The copolymers of this invention have a number of interesting and very useful utilities. The number and variety of these utilities is increased because the copolymers are linear and hence generally soluble. Thus, they are useful as soil conditioners. Some of the high molecular weight copolymers are useful for the production of films as by conventional casting from solution. Specifically, they can be used for protective and decorative coatings, as well as for insulating coatings on electrical equipment. They also find use as components of adhesive formulations. Certain of these copolymers are also useful for making molded articles, such as copolymers which contain copolymerized styrene, vinylidene chloride, methacrylates, acrylonitrile, and the like.

In general, the copolymer products of this invention are non-tacky solids at room temperature, except for certain copolymers of Formula 1 compounds with, respectively, lower vinyl esters (such as vinyl acetate) and lower alkyl acrylates (such as ethyl acrylate). These later copolymers tend to be tacky at room temperature (i.e., about 25° C.), the tackiness increasing with decreasing amounts of the Formula 1 compounds.

As will readily be understood by the art, the molecular weight of the copolymers of the invention is decreased by the addition of an active chain transfer agent during polymerization such as, for example, n-butyl mercaptan, dibutyl disulfide, carbon tetrachloride, chloroform, benzal chloride, and the like.

The properties and related utilities of the copolymers of this invention can also be varied by changing the mole ratio of comonomers of Formulas 1 and 2 above employed in making the copolymers of this invention. This is shown by the ratio of $m/n$ in the above general formula.

The mole ratio of the comonomers in the copolymers of the invention is dependent both upon the molar ratio of the reactants charged to the reaction vessel during the preparation of these copolymers and also upon the relative reactivities of the Formulas 1 and 2 compounds in copolymerization and copolymers of the invention are formed having substantially similar ratios of comonomers to those of copolymers formed with vinyl chloride or vinyl acetate with the same Formula 2 compound under like conditions. The relative reactivity ratios for compounds of Formula 1 are thus similar to those for vinyl chloride or vinyl acetate. In general, all monomers which have a relative reactivity ratio greater than about 0.02 with vinyl acetate or vinyl chloride are copolymerizable with compounds of Formula 1.

The copolymers of the invention are prepared by heating a mixture of at least one compound of Formula 1, at least one compound of Formula 2 and a free radical initiator, all contained in a suitable solvent.

Conventional "free-radical initiators" are capable of initiating polymer formation in the systems of the invention. Suitable free-radical initiators include, for example, such materials as benzoyl peroxide, azobisisobutyronitrile, ditertiary butyl peroxide, lauroyl peroxide, dicumyl peroxide, peracetic acid, cumylhydroperoxide, alkali metal persulfates, combinations of such materials as sodium bi-sulfite and ammonium per-sulfate, sodium bi-sulfite and sodium persulfate, and the like.

The use of a solvent in the processes of this invention is incidental and not critical but offers the advantage of controlling reactions in which there is a considerable exotherm. It is also an advantage where the respective monomers are solids at polymerization temperatures. In general, any solvent having a solubility parameter of about 10 or greater can be used which is non-reactive with both the reagents and their associated radicals used in forming a given copolymer of this invention. A tabulation of the solubility parameters of some common solvents is found in the Official Digest, 27, 743 (1955). Specific examples of suitable solvents for use in this invention include benzene, acetonitrile, dimethylformamide, dimethylsulfoxide, dioxane, and the like.

Ordinarily in solution copolymerization procedures, one simply adds the compounds of Formulas 1 and 2 to the desired solvent which already contains the radical initiator. The resulting mixture is agitated to insure mixing, and heated, preferably in the absence of oxygen, in a temperature range of from about 50° to about 100° C., where the initiator is substantially decomposed for, times of up to about 16 hours or less.

The copolymers of this invention are also prepared by emulsion polymerization. In this technique, which is well known to the art, a mixture of the comonomers, water, an emulsifying agent, a free radical initiator and optionally a chain transfer agent or promoter is agitated and heated in the absence of oxygen.

Copolymers of the invention which contain anhydride, ester, nitrile or carboxyl functional groups are hydrolyzed to the carboxylate salt form by treatment with dilute aqueous base at 50–100° C. until disolution occurs. The free carboxylic acid forms of the copolymers are in turn obtained when the solutions of the salts are acidified with 3 N hydrochloric acid. These groups in the cyclic moiety tend to decarboxylate in the manner expected of malonic acids.

The invention is further illustrated by the following examples.

EXAMPLE 1

A mixture of 2,2-diallyldiethylmalonate (5.0 g.) ethyl acrylate (2.40 g.), benzene (5.0 g.) and azobisisobutyronitrile (0.52 g.) is heated in a sealed glass pressure vessel at 50° C. for 16 hours in the absence of air. The viscous mixture is poured into excess heptane and the sticky precipitate redisolved three times in methylene chloride nad reprecipitated in heptane. It is then dried at 0.1 mm. at 50° C. for 16 hours. The product copolymer is a sticky strong rubber which adheres tenaciously to glass and metal surfaces and is a good adhesive. The copolymer has an inherent viscosity of 0.42 at a concentration of 0.52 g./100 ml. in benzene.

*Analysis.*—C, 62.0%; H, 8.2%.

This corresponds to a mole ratio of .32/1.0 for 2,2-diallyldiethylmalonate/ethyl acrylate. The weight percent of the malonate in the copolymer is about 40 percent.

The infrared absorption spectrum is consistent with the presence of polymerized forms of both comonomers. No residual allylic unsaturation is observed.

EXAMPLE 2

A mixture of 2,2-diallyldiethylmalonate (7.0 g.) acrylonitrile (1.8 g.), benzene (5.9 g.) and benzoyl peroxide (0.70 g.) is heated at 50° C. for 65 hours with agitation in a sealed glass vessel in the absence of air. The mixture is poured into dry diethyl ether. The solid is repreciptated three times by dissolving in benzene and pouring into ether and is then dried. The copolymer has an inherent viscosity of 0.41 in dimethylformamide at 1.35 g./100 ml.

*Analysis.*—C, 66.3%; H, 6.8%; N, 13.8%.

The mole ratio of polymerized diallyldiethylmalonate (in cyclized form) to polymerized acrylonitrile is 0.31/1. The malonate moieties of the copolymer are 57 percent by weight.

The following table shows examples of copolymers of 2,2-diallyldiethylmalonate obtained with various comonomers according to the procedure in Example 2 except that heptane is used in place of ether for precipitation of the copolymers. Equimolar amounts of comonomer and 2,2-diallyldiethylmalonate are charged. The weight percent and mole ratios of polymerized monomer units are calculated from the elemental analysis. In each instance infrared spectra are consistent with the structures indicated for the copolymers on the basis of the general formula hereinabove.

*Table 1*

| Ex. No. | Wt. 2,2-diallyl-diethyl malonate charged, g. | Comonomer | Wt. co-monomer charged, g. | Wt. co-polymer obtained, g. | Elemental analysis of copolymer, percent | | | Mole ratio polymerized 2,2-diallyl-diethylmalonate/co-monomer in copolymer | Wt. percent polymerized 2,2-diallyl-diethylmalonate in co-polymer | Inherent viscosity (solvent listed) | Comments on copolymer |
|---|---|---|---|---|---|---|---|---|---|---|---|
| | | | | | C | H | Cl | | | | |
| 3 | 7.0 | Vinyl chloride | 0.21 | 2.61 | 56.5 | 7.1 | 18.6 | 0.54/1 | 68 | 0.07 ($C_6H_6$) | |
| 4 | 7. | Vinyl acetate | 2.89 | 3.54 | 62.7 | 8.0 | | 1.19/1 | 75 | 0.08 ($C_6H_6$) | Tough adhesive at 25° C. |
| 5 | 7.0 | Maleic anhydride | 3.30 | 5.55 | 60.3 | 6.7 | | .89/1 | 72 | 0.10 ($CH_2Cl_2$) | Cross-linking for epoxy resins. |
| 6 | 7.0 | Styrene | 3.48 | 0.56 | 88.2 | 7.8 | | .088/1 | 15 | 0.02 ($C_6H_6$) | |

The examples shown in the following Table II are carried out by the general procedure of Example 1:

about 1:200 to about 3:2 and their sum is not less than 5 and up to about 500.

Table II

| Ex. No. | Diethylenically substituted comonomer | Weight charged, g. | Monoethylenically substituted comonomer | Weight charged, g. | Catalyst and weight, g. | Solvent and weight g. | Comments on polymer |
|---|---|---|---|---|---|---|---|
| 7 | 2,2-diallyldiethyl malonate. | 7.00 | Vinyl bromide | 3.12 | Benzoyl peroxide .90 | Methylene chloride, 10. | |
| 8 | do | 3.50 | 1,1-dihydroperfluoro-butyl acrylate. | 14.50 | Benzoyl peroxide 1.0 | Methylene chloride, 12. | Solvent resistant rubber. |
| 9 | do | 7.00 | Acrylic acid | 2.10 | Benzoyl peroxide 0.90. | Methylene chloride, 9. | |
| 10 | do | 7.00 | Methyl methacrylate | 2.90 | Benzoyl peroxide 0.70. | Methylene chloride, 9. | |
| 11 | do | 7.00 | Vinylene carbonate | 5.00 | Benzoyl peroxide 1.1 | Methylene chloride, 12. | Solid. |
| 12 | 2,2-diallyldibutyl malonate. | 4.40 | Acrylonitrile | 7.95 | Benzoyl peroxide 1.1 | Acetonitrile, 12 | Do. |
| 13 | 2,2-diallyldioctadecyl malonate. | 5.10 | Ethyl acrylate | 5.00 | Benzoyl peroxide 0.60. | Benzene, 10 | Soft adhesive. |
| 14 | 2,2-diallylethylcyanoacetate. | 4.64 | do | 2.40 | Azobisisobutyronitrile, 0.60. | Benzene, 6 | Good adhesive. |
| 15 | do | 2.72 | Acrylonitrile | 7.95 | Azobisisobutyronitrile, 0.70. | Acetonitrile, 10 | Solid with moderate softening point. |
| 16 | 2,2-diallylbutylcyanoacetate. | 2.51 | Ethyl acrylate | 2.40 | Azobisisobutyronitrile, 0.40. | Methylene chloride, 5 | Strong adhesive. |

What is claimed is:

1. A linear copolymer consisting essentially of randomly recurring units of the general formula

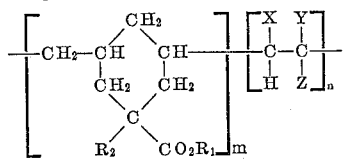

wherein $R_1$ is an alkyl radical having from 1 to 18 carbon atoms, $R_2$ is a member of the group consisting of —$CO_2R_1$ and —CN, and wherein taken singly, X is selected from the group consisting of hydrogen and methyl, Y is hydrogen and Z is selected from the group consisting of hydrogen, chlorine, bromine, lower acyloxy, lower alkoxycarbonyl, lower perfluoroalkoxycarbonyl, carboxy, cyano, phenyl and methyl and, taken together, X and Y with the two carbon atoms between them form a ring structure selected from the group consisting of 1,3-dioxol-2-one and dihydrofuran-2,5-dione and Z is selected from the group consisting of hydrogen and methyl, and $m$ and $n$ are integral numbers in a ratio of from about 1:200 to about 3:2 and their sum is not less than 5 and up to about 500.

2. A linear copolymer consisting essentially of randomly recurring units of the general formula:

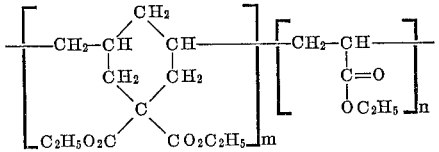

wherein $m$ and $n$ are integral numbers in a ratio of from about 1:200 to about 3:2 and their sum is not less than 5 and up to about 500.

3. A linear copolymer consisting essentially of randomly recurring units of the general formula:

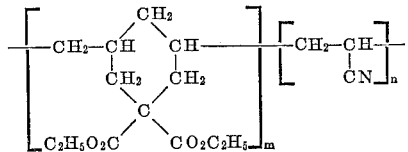

wherein $m$ and $n$ are integral numbers in a ratio of from about 1:200 to about 3:2 and their sum is not less than 5 and up to about 500.

4. A linear copolymer consisting essentially of randomly recurring units of the general formula:

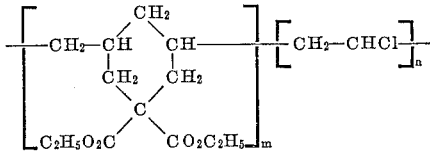

wherein $m$ and $n$ are integral numbers in a ratio of from about 1:200 to about 3:2 and their sum is not less than 5 and up to about 500.

5. A linear copolymer consisting essentially of randomly recurring units of the general formula:

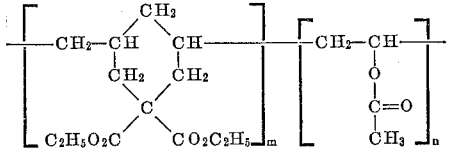

wherein $m$ and $n$ are integral numbers in a ratio of from about 1,200 to about 3:2 and their sum is not less than 5 and up to about 500.

6. A linear copolymer consisting essentially of randomly recurring units of the general formula:

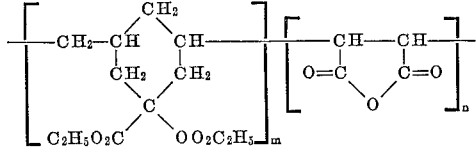

wherein $m$ and $n$ are integral numbers in a ratio of from about 1:200 to about 3:2 and their sum is not less than 5 and up to about 500.

7. A linear copolymer consisting essentially of randomly recurring units of the general formula:

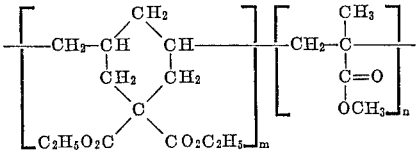

wherein $m$ and $n$ are integral numbers in a ratio of from about 1:200 to about 3:2 and their sum is not less than 5 and up to about 500.

8. A linear copolymer consisting essentially of randomly recurring units of the general formula:

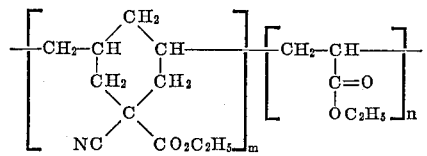

wherein $m$ and $n$ are integral numbers in a ratio of from about 1:200 to about 3:2 and their sum is not less than 5 and up to about 500.

References Cited by the Examiner

UNITED STATES PATENTS

| 2,313,501 | 3/1943 | Bachman et al. | 260—78.5 |
| 3,057,829 | 10/1962 | Wright | 260—78.5 |

FOREIGN PATENTS

| 798,563 | 7/1958 | Great Britain. |
| 850,828 | 10/1960 | Great Britain. |

JOSEPH L. SCHOFER, *Primary Examiner*.
DONALD E. CZAJA, *Examiner*.